United States Patent [19]

Irvine et al.

[11] 4,247,337

[45] Jan. 27, 1981

[54] COPPER PHTHALOCYANINE DERIVATIVES

[75] Inventors: Alexander M. Irvine, Dean Park; John B. Blackburn, Beith, both of Scotland

[73] Assignee: Ciba-Geigy Corporation, Ardsley, N.Y.

[21] Appl. No.: 87,132

[22] Filed: Oct. 22, 1979

Related U.S. Application Data

[62] Division of Ser. No. 855,500, Nov. 28, 1977, Pat. No. 4,199,509.

[30] Foreign Application Priority Data

Dec. 1, 1976 [GB] United Kingdom ............... 50054/76

[51] Int. Cl.$^3$ .............................................. C09B 47/04
[52] U.S. Cl. .......................... 106/288 Q; 260/42.21; 260/314.5; 8/661; 106/23
[58] Field of Search ............ 106/288 Q, 23; 260/424; 8/1 XA

[56] References Cited

U.S. PATENT DOCUMENTS

| | | | |
|---|---|---|---|
| 2,528,390 | 10/1950 | Sayler | 260/314.5 X |
| 3,325,511 | 6/1967 | Lesslie et al. | 260/314.5 |
| 3,334,116 | 8/1967 | Bryan et al. | 260/314.5 |
| 4,199,509 | 4/1980 | Irvine et al. | 260/314.5 |

*Primary Examiner*—John D. Randolph
*Attorney, Agent, or Firm*—Harry Falber

[57] ABSTRACT

Copper phthalocyanine derivatives of the formula

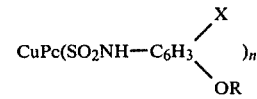

or mixtures thereof wherein CuPc is optionally substituted copper phthalocyanine, n is a value from 1 to 4, X is hydrogen, 1–4C alkyl, 1–4C alkoxy or halogen, and R is linear or branched alkyl of 1 to 22 C-atoms which may be substituted with one or more alkoxy, dialkylamino or alkylthio, the alkyls having 1 to 22 C-atoms, or arylalkyl, the alkyl having 1 to 4 C-atoms and the aryl being optionally substituted by one or more non-water solubilizing groups, which incorporated into a phthalocyanine pigment, provide excellent flocculation resistance in paint and printing ink media.

3 Claims, No Drawings

COPPER PHTHALOCYANINE DERIVATIVES

This is a divisional of application Ser. No. 855,500 filed on Nov. 28, 1977, now U.S. Pat. No. 4,199,509 granted Apr. 22, 1980.

Phthalocyanine pigments, especially copper phthalocyanines, by virtue of their low cost, high strength, brilliant shades and outstanding general fastness properties are of great commercial significance.

In paint and lacquer systems however, phthalocyanine pigments tend to suffer from a defect, namely flocculation. The defect manifests itself especially in non-aqueous systems. If paints containing flocculating phthalocyanine pigments are applied under different conditions of shear, widely different colour strengths can be obtained. Similarly, when paints or printing inks containing flocculating phthalocyanine pigments are stored, the pigment particles tend to aggregate with resulting loss of tinctorial strength and homogeneity of the paint or ink.

We have now found copper phthalocyanine derivatives which, when incorporated into a phthalocyanine pigment, provide a phthalocyanine pigment composition having excellent flocculation resistance in decorative alkyd and industrial paint media and solvent/resin or oil-based printing ink media, the resulting pigmented media exhibiting improved flow and other desirable pigmentary properties.

According to the present invention, there are provided copper phthalocyanine derivatives having the formula:

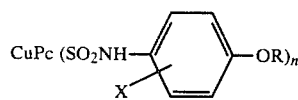
I or a mixture of two or more derivatives, wherein CuPc represents the residue of a copper phthalocyanine molecule, n is a value from 1 to 4, preferably from 1.5 to 3.0 especially from 2.0 to 2.25, X is hydrogen, 1–4C alkyl, 1–4C alkoxy or halogen, and R is an organic residue consisting of a linear or branched alkyl chain containing from 1 to 22, preferably 12 to 18, carbon atoms, optionally substituted with one or more alkoxy, dialkylamino or alkylthio groups, the alkyl groups of which may themselves contain 1 to 22 carbon atoms in a linear or branched chain, and, in the case of the dialkylamino residues, may be different, or an arylalkyl group having from 1 to 4 carbon atoms in the alkyl moiety and the aryl moiety being optionally substituted by one or more non-water solubilising groups.

By the term "non-water solubilising" group, we mean any group which does not impart any substantial water solubility to the basic pigment molecule. Examples of such groups are alkyl, alkoxy, carboxyalkyl or alkylcarbamoyl groups each having from 1 to 4 carbon atoms in the alkyl moiety, arylcarboxy-arylamide, arylcarbamoyl or nitro groups, or halogen atoms, especially chlorine or bromine atoms.

The present invention also provides a process for the production of the compounds of formula I comprising reacting a compound of formula:

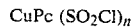 II wherein n has its previous significance, with n molecules of an amino formula:

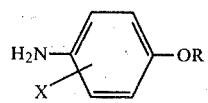
III wherein R and X have their previous significance.

Examples of amines of formula III which may be employed in the process of the invention include:
4-octyloxy aniline
4-(2-ethylhexyloxy)aniline
4-(3,5,5-trimethyl hexyloxy)aniline
4-decyloxy aniline
4-dodecyloxy aniline
4-tetradecyloxy aniline
4-hexadecyloxy aniline
4-octadecyloxy aniline
4-eicosyloxy aniline
4-(2-methoxyethoxy)aniline
4-(2-(2-butoxyethoxy)-ethoxy)-ethoxy)-aniline
4-(2-(N,N-dimethylamino)ethoxy)aniline
4-(phenylmethoxy)aniline
4-(2-phenylethoxy)aniline
4-(3-phenylpropoxy)aniline
4-(4-phenylbutoxy)aniline
4-(2-(2-,3- or 4-chlorophenoxy)-ethoxy aniline
3-chloro-4-dodecyloxyaniline
3-chloro-4-hexadecyloxyaniline
4-hexadecyloxy-3-methoxyaniline
as well as their salts with mineral acids or low molecular weight organic acids.

The reaction is conveniently effected in an organic solvent which is inert in the reaction, e.g. an optionally substituted aromatic hydrocarbon such as toluene or nitrobenzene or an aliphatic solvent, e.g. kerosene or isopropanol, and at the reflux temperature of the reaction mixture or at some other appropriate temperature.

The starting-materials of formula II and III are known compounds.

As already premised, the compounds of formula I have value as flocculation stabilisers for phthalocyanine pigments, especially the alpha and beta forms of copper phthalocyanine, and the flocculation-stabilised pigment compositions so produced impart improved flow properties to surface coating media containing said pigment compositions.

Accordingly, the present invention further provides a pigment composition comprising a phthalocyanine pigment susceptible to flocculation and 2–25% especially 5–15% by weight, based on the weight of the flocculating phthalocyanine, of a compound of formula I as hereinbefore defined.

The present invention still further provides a composition comprising an organic material and a pigmenting proportion of a pigment composition according to this invention.

The phthalocyanine pigment susceptible to flocculation may be a metal-free or a metal- containing phthalocyanine pigment. Of these, the latter class is more important for use in this invention, particularly those containing cobalt, nickel or, especially, a copper atom.

Pigment compositions according to this invention may be produced by a variety of methods. Preferably, however, the compound of formula I may be incorporated into the flocculating phthalocyanine during the conversion of the latter from its crude state into its pigmentary form. Alternatively, the pigmentary flocculating phthalocyanine and the compound of formula I may be physically blended together before, during or after incorporation of pigment composition into an application medium e.g. a surface coating medium.

The pigment compositions of this invention can also contain natural resins such as abietic acid or esters thereof, ethyl cellulose, cellulose acetobutyrate, alkaline earth metal salts of higher fatty acids, fatty amines such as stearylamine or rosin amine, vinyl chloride/vinyl acetate copolymers, polyacrylonitrile or polyterpene resins.

Organic materials suitable for colouration by the pigment compositions of the present invention include natural or synthetic polymers or copolymers, coating compositions for application to the surface of an article and printing ink media. Preferred organic materials are paints, lacquers and other surface coating compositions, or tinting compositions for use in such coating compositions and printing inks.

Pigment compositions of the invention containing compounds of formula I are particularly useful for incorporation into gravure printing ink and paint media, whereby the flow properties of these pigmented media are considerably improved.

The following Examples further illustrate the present invention. Parts and percentages shown therein are by weight.

EXAMPLE 1

10 parts of 4(3,5,5-trimethyl hexyloxy)aniline and 10.8 parts of chlorosulphonated copper phthalocyanine (chlorine content 9.45%) were refluxed in 150 parts by volume of toluene for 12 hours with stirring. The toluene was removed as an azeotrope with ethanol, the product filtered off, washed with ethanol and dried at 50° C. giving 12 parts of blue solid.

EXAMPLE 2

77 parts of 4-cetyloxy aniline and 80.6 parts of chloro sulphonated copper phthalocyanine (chlorine content 9.22%) were refluxed in 800 parts by volume of toluene for 16 hours with stirring. The toluene was then removed as an azeotrope with ethanol, the product filtered off, washed with ethanol and dried at 50° C. giving 125 parts of blue solid.

EXAMPLE 3

By replacing the 4(3,5,5-trimethylhexyloxy)aniline of Example 1 by an equivalent amount of 4-stearyloxy aniline hydrochloride and then following the procedure of Example 1 a derivative of copper phthalocyanine was obtained which was then used as follows:

10.8 parts of an unmodified 100% β-copper phthalocyanine pigment, 1.2 parts of the above derivative, 48 parts of a 50% solution of Alsynol RL30 (a commercially available phenolic resin) in toluene and 40 parts of toluene were ball-milled for 16 hours. This gave a free flowing gravure ink 90% of which discharged from the mill, whereas the unmodified pigment alone, when milled at the same percentage pigmentation, gave less than 10% discharge. The ink also exhibits superior strength and gloss when printed.

EXAMPLE 4

By replacing the 4-stearyloxy aniline of Example 3 with an equivalent amount of 4-octyloxy aniline a similar ink is obtained which gives 85% discharge.

The following table illustrates a variety of alkoxy-aryl amines which were used in this manner with their respective percentage discharges.

| Amine | % Discharge |
|---|---|
| 4-dodecyloxy aniline | 88% |
| 4-(2-methoxy ethoxy)aniline | 71% |
| 4-(2-(2-(2-butoxy ethoxy) ethoxy)-ethoxy)-aniline | 88% |
| 4-(3-phenyl propoxy)-aniline | 93% |
| 4-(2-(4-chlorophenoxy)-ethoxy)-aniline | 88% |
| 4-(2-(N,N-dimethylamino-ethoxy)aniline | 90% |

EXAMPLE 5

500 parts of crude β-copper phthalocyanine were ground in the presence of 40 parts of phthalimide to give a pigmentary mixture of alpha and beta copper phthalocyanine containing 65% alpha phase material. This mixture was then refluxed with stirring for 5½ hours in 3000 parts by volume of isopropanol/azeotrope. 50 parts of the product of Example 2 were added followed by 50 parts by volume of diethylaniline and reflux was continued for 15 minutes. 3000 parts of water were added and the isopropanol/water azeotrope was distilled off. 410 parts by volume of 5 N hydrochloric acid were added and the slurry stirred for 30 minutes, filtered, thoroughly washed with hot water and dried to give 525 parts of blue pigment, which when incorporated into a gravure ink medium, for example of the type described in Example 3, exhibited improved flow, flocculation resistance, strength and gloss, by comparison with the pigment prepared as above but without the addition of the derivative of Example 2.

EXAMPLE 6

30 parts of copper phthalocyanine which contained 2.25% chlorine and which had been ground in the presence of sodium acetate to give a red shade blue powder were refluxed with stirring in 200 parts by volume of isopropanol/water azeotrope containing 3 parts of the product of Example 2. After 2 hours 200 parts of water were added and the isopropanol/water azeotrope distilled off. 30 parts of 5 N hydrochloric acid were added and the slurry stirred for 30 minutes, filtered, washed with hot water and dried at 50° C. When this product was milled into a typical decorative alkyd paint system a red-shade blue paint exhibiting good flow, flocculation resistance and strength, by comparison with a similar unmodified pigment, was obtained.

What we claim is:

1. A flocculation stabilized pigment composition comprising a phthalocyanine pigment susceptible to flocculation and 2–25% by weight, based on said phthalocyanine pigment, of a copper phthalocyanine of the formula (I)

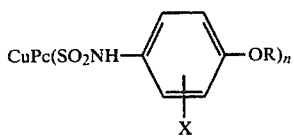

or a mixture thereof, wherein CuPc represents the residue of a copper phthalocyanine molecule, n is 1–4, X is hydrogen, $C_{1-4}$ alkyl, $C_{1-4}$ alkoxy or halo, and R is straight or branched chain alkyl of 1–22 carbon atoms, which is unsubstituted or substituted by one or more alkoxy, dialkylamino or alkylthio, the alkyl groups of which are straight or branched chain alkyl of 1–22 carbon atoms, and the alkyl groups in dialkylamino moiety are the same or different; or R is arylalkyl having 1–4 carbon atoms in the alkyl moiety thereof and the aryl moiety thereof being unsubstituted or substituted by one or more alkyl, alkoxy, carboxyalkyl or alkylcarbamoyl each having from 1–4 carbon atoms in the alkyl moiety thereof, arylcarboxyarylamido, arylcarbamoyl, nitro or halo.

2. A flocculation stabilized pigment composition according to claim 1, containing 5–15% by weight, based on said phthalocyanine pigment, of said copper phthalocyanine derivative.

3. A method of stabilizing a flocculation susceptible phthalocyanine pigment paint or lacquer composition by incorporating therein 5–15% by weight, based upon said phthalocyanine pigment, of a copper phthalocyanine derivative of formula I according to claim 1.

* * * * *